(12) United States Patent
Schanin et al.

(10) Patent No.: US 7,200,467 B2
(45) Date of Patent: Apr. 3, 2007

(54) METHOD AND APPARATUS FOR POWER MANAGEMENT CONTROL OF A COOLING SYSTEM IN A CONSUMER ACCESSIBLE APPLIANCE

(75) Inventors: David J. Schanin, Denver, CO (US); Daniel Bernard van der Hoop, Boulder, CO (US)

(73) Assignee: USA Technologies, Inc., Malvern, PA (US)

( * ) Notice: Subject to any disclaimer, the term of this patent is extended or adjusted under 35 U.S.C. 154(b) by 0 days.

(21) Appl. No.: 11/254,994

(22) Filed: Oct. 20, 2005

(65) Prior Publication Data

US 2006/0111815 A1    May 25, 2006

Related U.S. Application Data

(63) Continuation-in-part of application No. 10/291,066, filed on Nov. 8, 2002, now Pat. No. 6,975,926.

(51) Int. Cl.
G06F 17/00   (2006.01)

(52) U.S. Cl. .................. 700/231; 62/3.64; 62/457.4

(58) Field of Classification Search ............... 700/231, 700/241, 244, 283, 296, 300, 306
See application file for complete search history.

(56) References Cited

U.S. PATENT DOCUMENTS

| | | | |
|---|---|---|---|
| 4,417,450 A * | 11/1983 | Morgan et al. ............... 62/126 |
| 4,448,346 A * | 5/1984 | Kuwaki et al. ........... 236/46 R |
| 4,752,853 A | 6/1988 | Matsko et al. |
| 5,475,609 A | 12/1995 | Apothaker |
| 5,574,653 A | 11/1996 | Coomer et al. |
| 5,625,236 A | 4/1997 | Lefebvre et al. |
| 5,673,202 A | 9/1997 | Baldenweg et al. |
| 5,675,503 A | 10/1997 | Moe et al. |
| 5,696,695 A | 12/1997 | Ehlers et al. |
| 5,739,596 A | 4/1998 | Takizawa et al. |
| 5,761,083 A | 6/1998 | Brown, Jr. et al. |
| 5,943,246 A | 8/1999 | Porter |
| 5,962,989 A | 10/1999 | Baker |
| 6,104,968 A | 8/2000 | Ananth |

(Continued)

FOREIGN PATENT DOCUMENTS

EP    0 707 183 A2    4/1996

(Continued)

OTHER PUBLICATIONS

International Search Report for PCT International Application PCT/US2006/018877 mailed Oct. 20, 2006.

*Primary Examiner*—Leo Picard
*Assistant Examiner*—Chad Rapp
(74) *Attorney, Agent, or Firm*—RatnerPrestia

(57) ABSTRACT

Methods and apparatus that manage electric power consumed by an appliance are disclosed. The appliance has an interior accessible by consumers through a door having an open state and a closed state. The appliance includes a cooling system having at least a first mode of operation and a second mode of operation for cooling the interior of the appliance. Power consumption is managed by monitoring the appliance to identify the open state of the door and transitioning the cooling system of the appliance from the first mode of operation to the second mode of operation responsive at least in part to identification of the open state of the door.

20 Claims, 9 Drawing Sheets

U.S. PATENT DOCUMENTS

| | | |
|---|---|---|
| 6,112,135 A | 8/2000 | Peterson et al. |
| 6,243,626 B1 | 6/2001 | Schanin |
| 6,389,822 B1 * | 5/2002 | Schanin .......................... 62/89 |
| 6,409,090 B1 | 6/2002 | Gilvar et al. |
| 6,564,561 B2 * | 5/2003 | Daum et al. .................. 62/130 |
| 6,745,581 B2 | 6/2004 | King et al. |
| 6,782,706 B2 * | 8/2004 | Holmes et al. ............... 62/229 |
| 2004/0050075 A1 | 3/2004 | King et al. |
| 2004/0064218 A1 | 4/2004 | Schanin et al. |
| 2005/0177282 A1 | 8/2005 | Mason, II |
| 2005/0178135 A1 | 8/2005 | Schanin et al. |

FOREIGN PATENT DOCUMENTS

| | | |
|---|---|---|
| EP | 0 881 443 A1 | 12/1998 |
| WO | WO 00/75586 A1 | 12/2000 |

* cited by examiner

METHOD AND APPARATUS FOR POWER MANAGEMENT CONTROL OF A COOLING SYSTEM IN A CONSUMER ACCESSIBLE APPLIANCE

CROSS REFERENCE TO RELATED APPLICATIONS

This application is a continuation-in-part of U.S. patent application Ser. No. 10/291,066 filed Nov. 8, 2002, now U.S. Pat. No. 6,975,926 the contents of which are incorporated herein by reference.

FIELD OF THE INVENTION

The present invention relates to cooling systems and, more particularly, to methods and apparatus for reducing refrigerated appliance power consumption.

BACKGROUND OF THE INVENTION

Consumer accessible refrigerated appliances include cooling systems to refrigerate products such as canned or bottled beverages for purchase by consumers. The cooling systems are designed to maintain the interior of these appliances (and the products therein) within a predefined temperature range. Typically, a consumer accessible refrigerated appliance (herein appliance) has a door (generally glass) that is opened by either sliding the door to a side of the appliance or rotating the door about a hinged axis to gain access to the products therein. Such appliances are commonly referred to in the industry as reach-in coolers, slide coolers, or visi-coolers, for example.

It is not uncommon for the door of an appliance to remain ajar after it has been opened. When this occurs, the temperature within the appliance rises and often, even though running continuously, the cooling system is unable to cool the interior of the appliance much below the ambient temperature of the air surrounding the appliance. Thus, the cooling system wastes a large amount of power in attempting to cool the interior of the appliance with the interior of the appliance having essentially the same temperature as it would have if the cooling system were off. In addition, continuously running the cooling system may result in condensation freezing on the evaporator coils of the cooling system, thereby further reducing the efficiency of the cooling system.

Additionally, the cooling system of an appliance typically maintains the interior of the appliance within the predefined temperature range regardless of usage. Thus, the refrigerated appliance may consume a great deal of power/energy maintaining products therein at a low temperature even when there is no demand for the product. For example, if the appliance is located in a grocery store that is closed at night, the appliance will consume power to keep the product cool even though no one will be purchasing the product at those times.

Further, the cooling system of the appliance typically transitions the cooling system between two modes based on one or more absolute temperature set points. In a first mode of operation (e.g., a cooling needed mode), a compressor and an evaporator fan are both ON to lower the temperature to a predetermined low set point. In a second mode of operation (e.g., a no cooling needed mode), the compressor is OFF and the evaporator fan remains ON while the temperature is allowed to raise to a predetermined high set point. Thus, the evaporator fan is always ON to circulate air within the appliance. In addition to circulating air, however, the evaporator fan introduces heat, which must then be removed through operation of the compressor.

SUMMARY OF THE INVENTION

The present invention is embodied in methods and apparatus that manage electric power consumed by an appliance. The appliance has an interior accessible by consumers through a door having an open state and a closed state. The appliance includes a cooling system having at least a first mode of operation and a second mode of operation for cooling the interior of the appliance. Power consumption is managed by monitoring the appliance to identify the open state of the door and transitioning the cooling system of the appliance from the first mode of operation to the second mode of operation responsive at least in part to identification of the open state of the door.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. The letter "n" may represent a non-specific number of elements. This emphasizes that according to common practice, the various features of the drawings are not drawn to scale. On the contrary, the dimensions of the various features are arbitrarily expanded or reduced for clarity. Included in the drawings are the following figures.

DETAILED DESCRIPTION OF THE INVENTION

Figure 1:
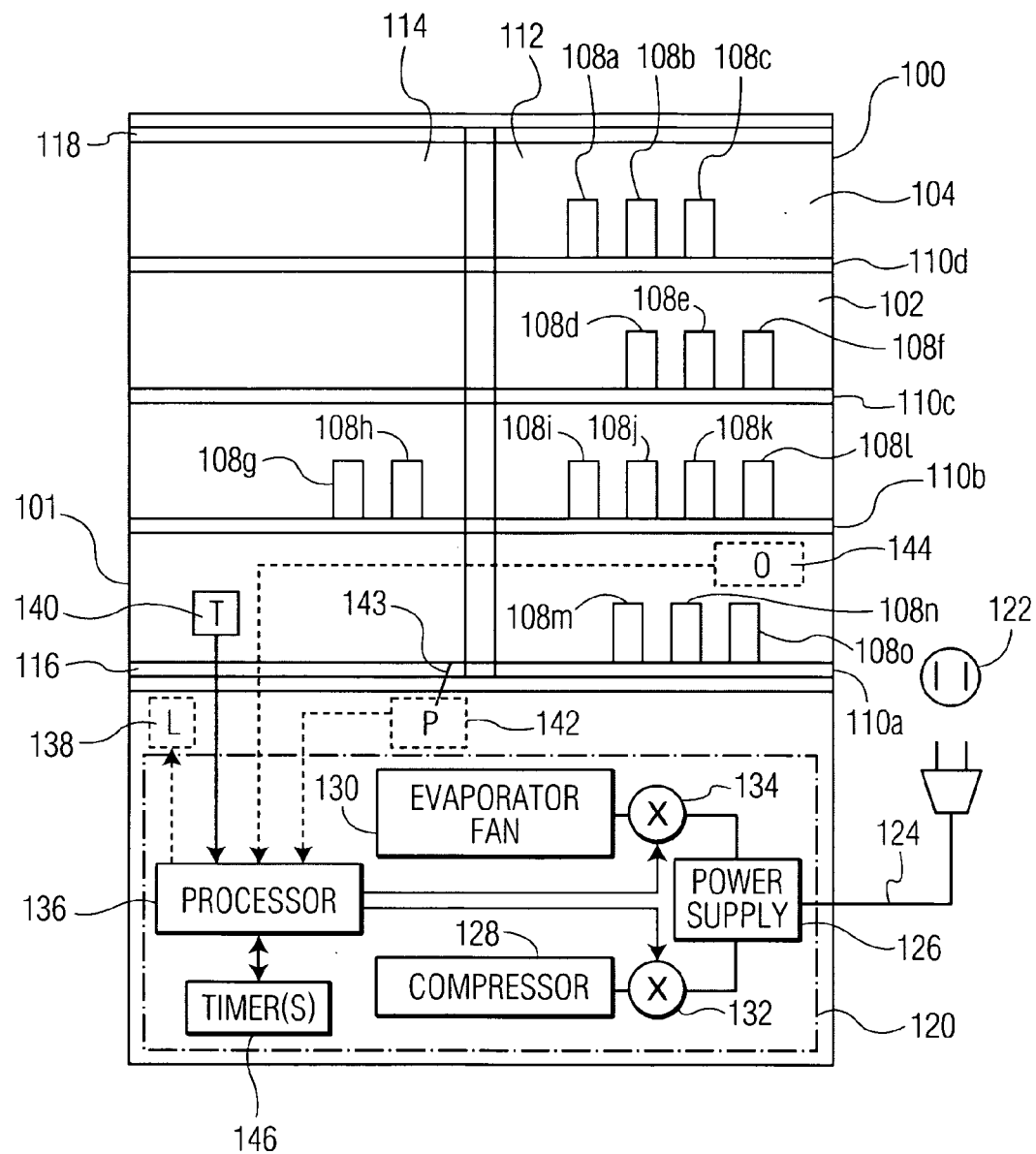
FIG. 1 is a schematic diagram of a refrigerated appliance with a cooling system in accordance with an exemplary embodiment of the present invention.

FIG. 1 depicts an exemplary appliance 100. Illustrated appliance 100 includes a housing 101 having a product display area 102 with an interior 104. Appliance 100 is depicted with a plurality of products within product display area 102 (represented by products 108a–o positioned on shelves 110a–d). Exemplary products, by non-limiting example, include canned or bottled beverages, other ingestible items, or essentially any item that would benefit from refrigeration.

Interior 104 of appliance 100 (and, thus, products 108) may be accessed through one or more doors coupled to the housing 101 (represented by a first door 112 and a second door 114 in the illustrated embodiment), each door having an open state and a closed state. Doors 112/114 are illustrated in their closed state. In an exemplary embodiment, doors 112/114 are positioned within a track defined by a lower track 116 and an upper track 118. Doors 112/114 may be opened/closed by sliding doors 112/114 within the track from one side of appliance 100 toward the other. For example, first door 112 may be opened by sliding it to the left and second door 114 may be opened by sliding it to the right. In an alternative exemplary embodiment, doors 112/114 may be opened by pivoting doors 112/114 about hinges (not shown) on a side of doors 112/114. Various alternative methods for enabling access to interior 104 of appliance 100 will be understood by one of skill in the art from the description herein. For ease of description, the invention is described below in terms of a single door 112 that may be opened by sliding it to the left and closed by sliding it to the right.

A cooling system 120 controls the temperature of interior 104 of appliance 100. Power for the cooling system 120 may be provided by a conventional power outlet 122 via a power cord 124. Power from power outlet 122 is received by a power supply 126 within cooling system 120. Power supply 126 supplies power to a compressor 128 and an evaporator fan 130 via a first switch 132 and a second switch 134, respectively, that are controlled by control signals received from a processor 136 (described in further detail below). Evaporator fan 130 is typically located within interior 104 of appliance 100 to remove heat from interior 104, but is illustrated in FIG. 1 outside interior 104 for the sake of clarity in the figure. In addition, power supply 126 may further supply power to a condenser fan (not shown), which may receive power via first switch 132, may be controlled separately, or may be configured to receive power continuously (i.e., always ON). It is contemplated that power supply 126 may be eliminated—with power from outlet 122 being supplied directly to at least one of switches 132/134. The cooling system 120 may further include one or more visual indicators (such as optional LED 138) that are under control of processor 136. Suitable components for use within cooling system 120 will be understood by one of skill in the art from the description herein.

Processor 136 configures cooling system 120 by controlling the flow of power to compressor 128 and evaporator fan 130 of cooling system 120 in accordance with cooling modes (described below) based at least in part on temperature feedback received from interior 104 of appliance 100.

Processor 136 may work together with other known cooling controls (e.g., mechanical cold controls) in appliance 100 or may perform all cooling operations. In an exemplary embodiment, temperature feedback is received from a temperature sensor 140 (e.g., a thermister) positioned within interior 104 of appliance 100. Additionally, processor 136 may receive an actuated signal from an optional proximity sensor 142 and/or an occupancy signal from an optional occupancy sensor 144. Processor 136 may include an internal timer(s) or an external timer(s) 146 (as illustrated). Processor 136 may control the flow of power to compressor 128 and evaporator fan 130 based further on the actuated signal, occupancy sensor, and/or timer values. Suitable temperature sensors, proximity sensors, occupancy sensors, and timers for use with the present invention will be understood by one of skill in the art from the description herein.

In exemplary embodiments including proximity sensor 142, proximity sensor 142 is positioned such that a signal is generated when door 112 of appliance 100 is opened. In exemplary embodiments including occupancy sensor 144, occupancy sensor 144 may be an infrared (IR) sensor, for example, that monitors the IR spectrum within interior 104 of appliance 100. The IR sensor senses when door 112 is open by sensing a change in IR spectrum. In accordance with this embodiment, door 112 of appliance 100 is preferably opaque to IR light and, thus, general pedestrian traffic passing by appliance 100 does not result in a false indication that door 112 is open.

Figure 2:
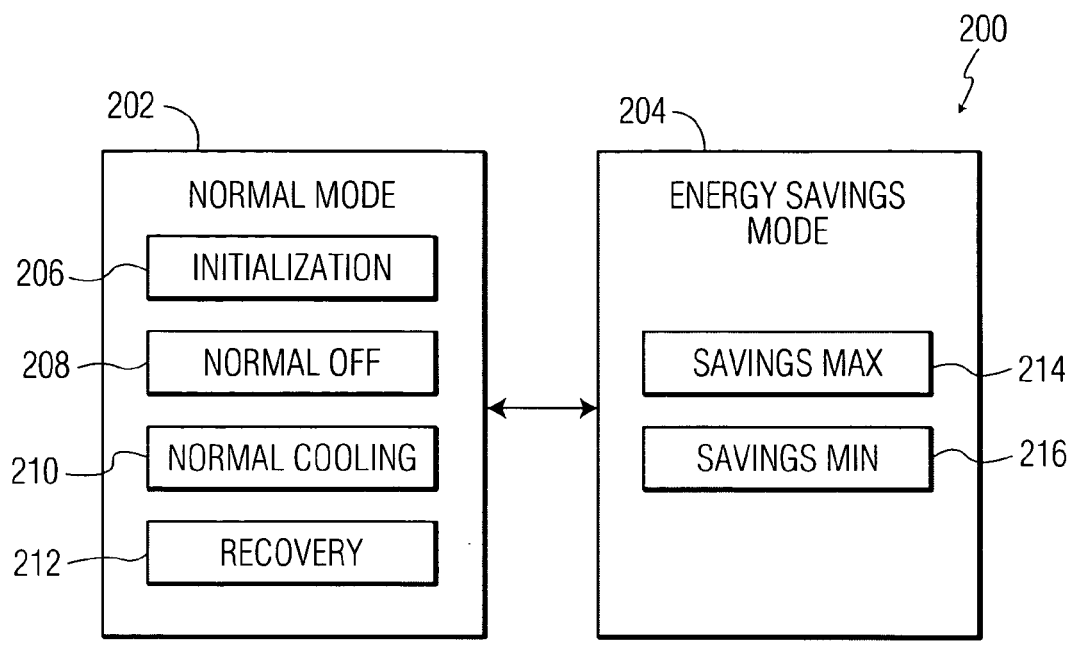
FIG. 2 is a block diagram of exemplary cooling modes implemented by the cooling system of FIG. 1 in accordance with various aspects of the present invention.

FIG. 2 depicts exemplary cooling modes of operation 200 that processor 100 (FIG. 1) implements to control cooling system 120. Cooling modes of operation 200 include a normal mode of operation 202 and an energy savings mode of operation 204, which consumes less power than normal mode of operation 202. In an exemplary embodiment, normal mode of operation 202 includes four different modes and energy savings mode of operation 204 includes two different modes. Illustrated normal mode of operation 202 includes an initialization mode 206, a normal off mode 208, a normal cooling mode 210, and a recovery mode 212. Illustrated energy savings mode of operation 204 includes a savings maximum (max) mode 214 and a savings minimum (min) mode 216. In an exemplary embodiment, processor 136 implements these modes through separate control of evaporator fan 130 and compressor 128. Processor 136 may also control a condenser fan (not shown) in conjunction with compressor 128 to implement the modes, resulting in further energy savings. In the description below it will be understood that the condenser fan may be transitioned between ON and OFF essentially simultaneously with compressor 128 to implement the modes in accordance with exemplary embodiments of the present invention. These modes will be described in detail below.

In an exemplary embodiment, processor 136 transitions cooling system 120 from an energy savings mode of operation 204 (such as the savings max mode 214 or the savings min mode 216) to another mode such as one of the normal modes 202 in response to door 112 (FIG. 1) being detected as open. In addition, processor 136 may be configured to maintain one or more modes for at least a minimum period time, e.g., 30 seconds to 2 minutes, before transitioning to another mode. The modes may have the same minimum period of time or different minimum periods of time.

Figure 3:
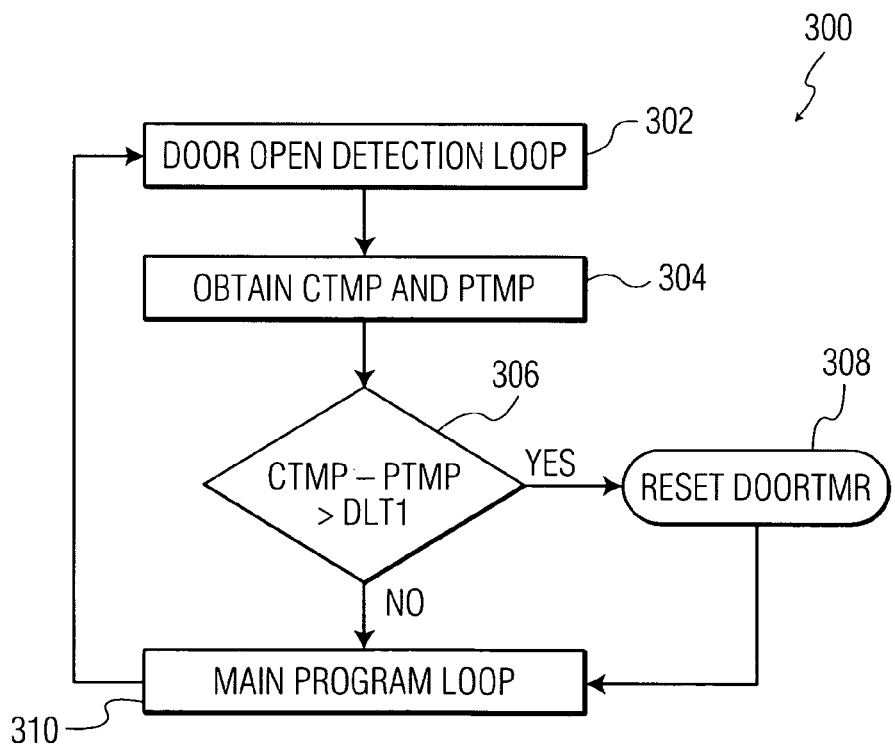
FIG. 3 is a flow chart of exemplary steps for identifying a door open state of the appliance of FIG. 1 in accordance with an exemplary embodiment of the present invention.

In an exemplary embodiment, an open door 112 is detected by processor 136 based on temperature readings within interior 104 of appliance 110. FIG. 3 depicts a flow chart 300 of exemplary steps for use by processor 136 of cooling system 120 in detecting if door 112 is open based on temperature readings within interior 104 of appliance 100, e.g., obtained through temperature sensor 140.

At block 302, a door open detection loop is entered. At block 304, a current sample temperature (CTMP) within interior 104 of appliance 100 and a previous sample temperature (PTMP) within interior 104 of appliance 100 are determined. The difference in time between CTMP and PTMP may be a relatively short period of time, e.g., 2, 5, or 10 seconds. In an exemplary embodiment, processor 136 determines CTMP and PTMP by taking numerous temperature samples per second (e.g., obtained from temperature sensor 140) and averaging them to remove noise from the samples. Processor 136 may obtain and store PTMP in a memory (not shown). In addition, processor 136 may obtain and store CTMP in the memory.

At block 306, a decision is made regarding the difference between CTMP and PTMP compared to a minimum rise temperature to detect a door open event (DLT1). If CTMP minus PTMP is greater than DLT1, processor 136 identifies door 112 as open and processing proceeds at block 308. Otherwise, processing proceeds at block 310. In an exemplary embodiment, the decision of block 306 is performed several times per minute, e.g., once every five or ten seconds.

At block 308, a door open timer (DOORTMR) is reset. In an exemplary embodiment, the DOORTMR increments once per minute and is reset when the difference between CTMP and PTMP exceeds a certain level. Thus, DOORTMR represents the elapsed time in minutes since the door was last open, i.e., how long the door has been closed. Since CTMP and PTMP are separated by a period of time, the difference between them represents a rate of change within the interior 104 of the appliance 100. Accordingly, if the rate of change exceeds a certain level, e.g., 0.2–0.4 degrees per sample, the door is detected as open.

At block 310, the end of the door open detection loop is reached and processing returns to block 302. In an exemplary embodiment, the door open detection loop runs continuously in the background as long as appliance 100 is receiving power. The door open detection loop may be configured to run on a faster clock than normal and energy savings modes 202/204. In addition, cooling system 120 may be configured to change states based on detection of an open door. The door open detection loop may include a roll over timer that prevents an open door condition from being communicated more frequently than a predefined period of time, e.g., once a minute.

In alternative exemplary embodiments, door 112 may be identified as open via proximity switch 142 and/or occupancy sensor 144 (FIG. 1). For example, as door 112 is moved to the left, a lever 143 on proximity switch 142 is actuated by the door 112, causing proximity switch 142 to identify to processor 136 that door 112 is open. In another example, opening door 112 or the insertion of a user's hand into interior 104 of appliance 100 may cause occupancy sensor 144 to identify to processor 136 that door 112 is open.

Figure 4:
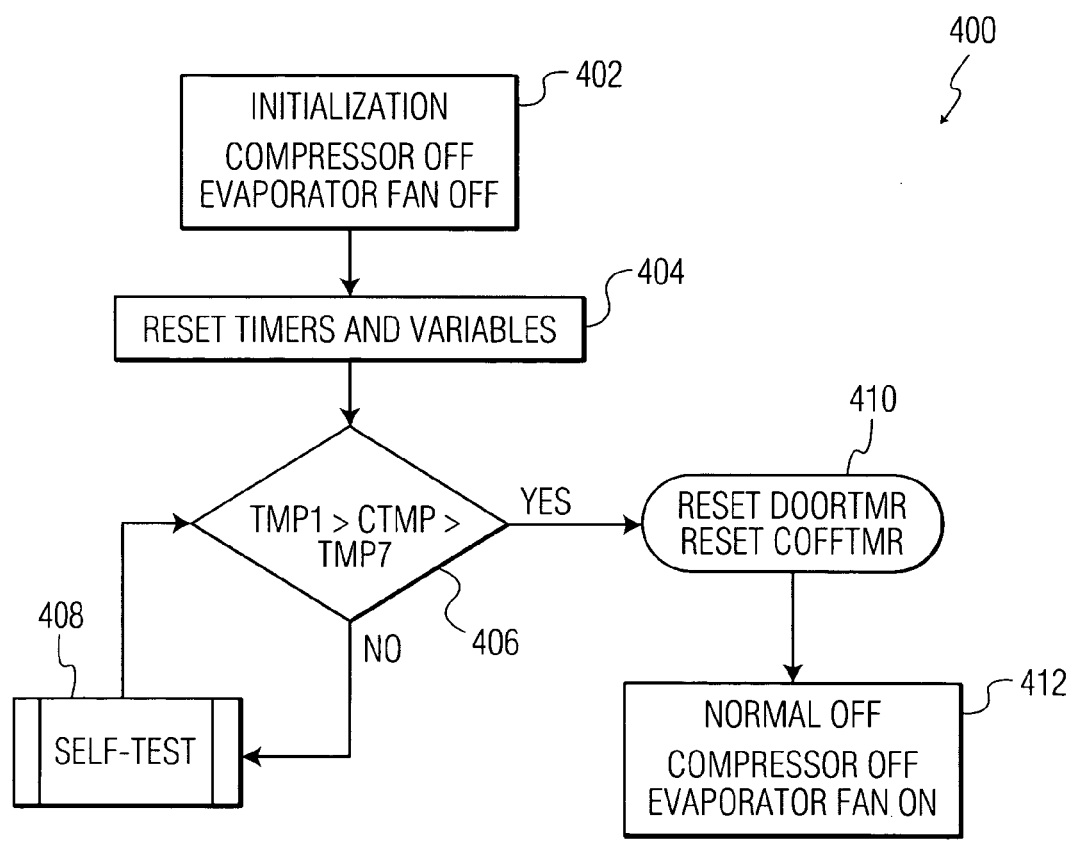
FIG. 4 is a flow chart of exemplary steps for monitoring and controlling the cooling system in an initialization mode in accordance with an exemplary embodiment of the present invention.

FIG. 4 depicts a flow chart 400 of exemplary steps for initialization mode 206 (FIG. 2). At block 402, initialization mode 206 is entered. In an exemplary embodiment, initialization mode 206 is entered only from initial "power on" of appliance 100 and, thus, compressor 128 (FIG. 1) is OFF and evaporator fan 130 is OFF at the start of initialization mode 206.

At block 404, timers and variables for the normal and energy savings modes 202/204 are initialized (reset). In an exemplary embodiment, the timers set forth below in Table 1 and the variable set forth below in Table 2 are reset. Timers listed in Table 1 may be configured to either increment or decrement at a predetermined rate, e.g., once per minute. Predefined variable values will be understood by one of skill in the art from the description herein.

TABLE 1

| Timers (Minutes) | |
| --- | --- |
| DOORTMR | Door Open Timer |
| FR1TMR | Freeze 1 Timer |
| FR2TMR | Freeze 2 Timer |
| CRUNTMR | Compressor Run Timer |
| ICETMR | Cooling Timer |
| COFFTMR | Compressor Off Timer |
| RECTMR | Recovery Timer |
| SAVETMR | Time in Saving Min/Max Timer |
| FOFFTMR | Evaporator Fan Off Timer |
| COOLTMR | Comp. Run Timer after HitTMP5 set |

TABLE 2

| Timer Variables (Minutes) | |
| --- | --- |
| T1 | Minimum time since a door open event was detected. |
| T2 | Maximum time since entering Savings Min/Max. |
| T3 | Minimum time since evaporator fan turned OFF. |
| T4 | Value of CRUNTMR when HitTMP5 flag set. |
| T5 | Maximum time since Freeze 1 timer last reset. |
| T6 | Maximum time since Freeze 2 timer last reset. |
| T7 | Maximum time for COOLTMR, set to 2 × T4 once HitTMP5 flag set. |
| T8 | Maximum time since ICETMR reset. |
| T9 | Minimum time since entering recovery. |
| T10 | Minimum time compressor must be turned OFF. |

At block 406, a decision is made regarding CTMP. If CTMP is within a normal operation temperature range, e.g., less than a high level operation temperature (TMP1) and greater than a low level operation temperature (TMP7), processing proceeds at block 410. Otherwise, processing proceeds at block 408.

A block 408, one or more diagnostic self-tests are performed. After the diagnostic self-tests are performed, processing proceeds at block 406 with the determination of whether CTMP is within the normal operation temperature range. Suitable diagnostic self-tests for use with the present invention will be understood by one of skill in the art from the description herein.

At block 410, DOORTMR and an off timer for compressor 128 (COFFTMR) are reset. COFFTMR represents the elapsed time compressor 128 has been OFF. Cooling system 120 then enters normal off mode 208 (FIG. 2) at block 412. When transitioning from initialization mode 402 to normal off mode 208, compressor 128 remains OFF and evaporator fan 130 is transitioned from OFF to ON.

Figure 5:
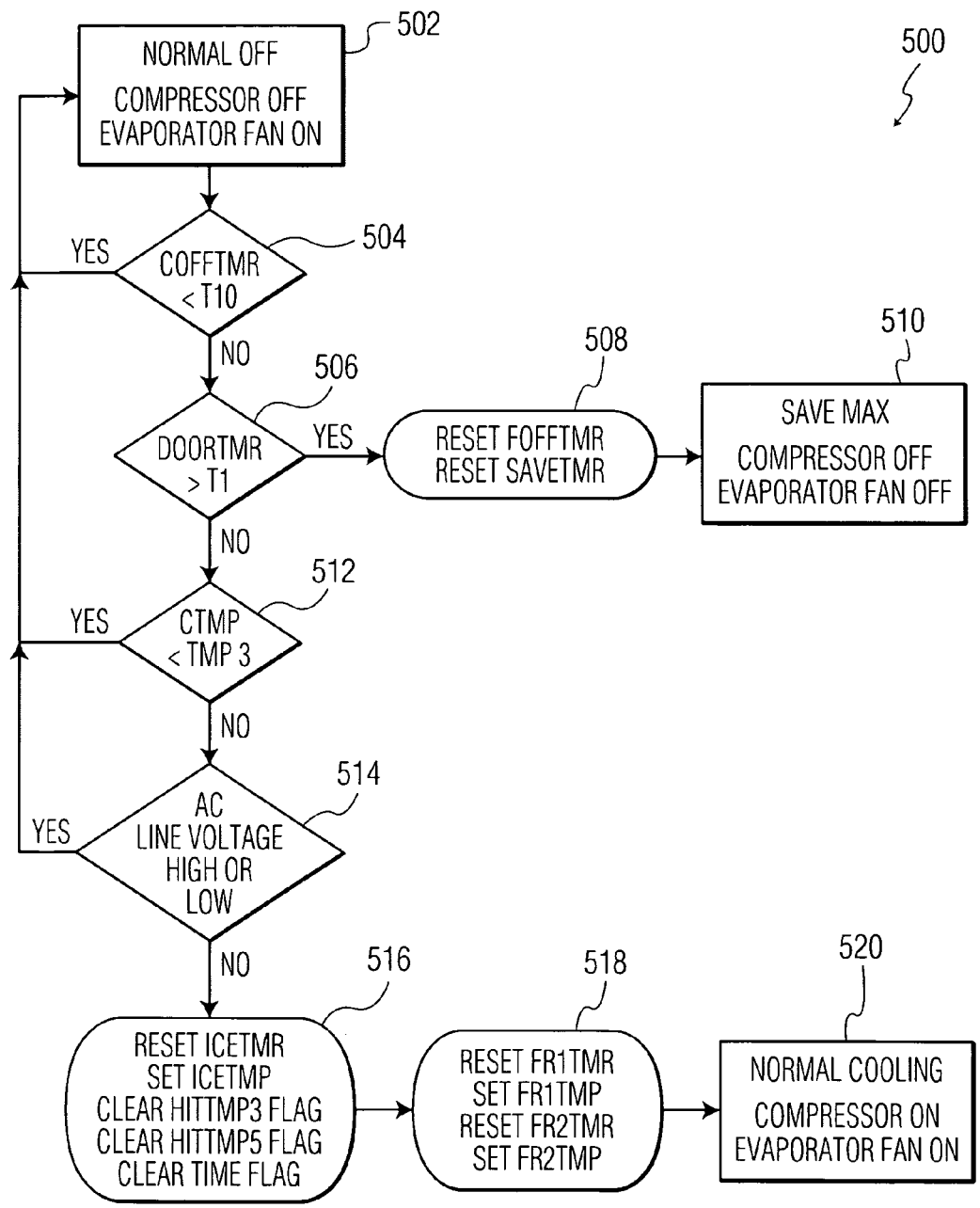
FIG. 5 is a flow chart of exemplary steps for monitoring and controlling the cooling system in an normal off mode in accordance with an exemplary embodiment of the present invention.

FIG. 5 depicts a flow chart 500 of exemplary steps for normal off mode 208 (FIG. 2). At block 502, normal off mode 208 is entered. In an exemplary embodiment, normal off mode 208 is the first mode entered after initialization mode 206 described above and can be entered from any other mode. In normal off mode 208, compressor 128 of cooling system 120 is OFF and evaporator fan 128 is ON.

At block 504, a decision is made regarding COFFTMR. If COFFTMR is less than a predefined minimum time compressor 128 must be turned OFF (T10), e.g., 30 second to 2 minutes, processing proceeds at block 502 with cooling system 120 in normal off mode 208. Otherwise, processing proceeds at block 506.

At block 506, a decision is made regarding DOORTMR. If DOORTMR is greater than a predefined minimum time since door 112 was detected open (T1), processing proceeds at block 508. Otherwise, processing proceeds at block 512.

At block 508, an off timer for evaporator 130 (FOFFTMR) and a timer representing the elapsed time in savings minimum and/or savings maximum mode (SAVETMR) are reset. Processing then proceeds to block 510 with cooling system 120 transitioning to energy savings max mode 214. When transitioning from normal off mode 208 to energy savings max mode 214, compressor 128 remains OFF and evaporator fan 130 is transitioned from ON to OFF.

At block 512, which is reached if DOORTMR is found to be less than or equal to T1 at block 506, a decision is made regarding CTMP. If CTMP is less than a predefined high set point for normal mode 202 (TMP3), processing proceeds at block 502 with cooling system 120 in normal off mode 208. Otherwise, processing proceeds at block 514.

At block 514, a decision is made regarding power source 122. If the power source 122 has a voltage level that is too low or too high, which may damage cooling system 120, processing proceeds at block 502 with cooling system 120 in normal off mode 208. Otherwise, processing proceeds at block 516.

At blocks 516 and 518, a cooling timer (ICETMR), a first freezer timer (FR1TMR), and a second freezer timer (FR2TMR) are reset; a temperature when ICETMR is reset (ICETMP), a temperature when FR1TMR is reset (FR1TMP), and a temperature when FR2TMR is reset (FR2TMP) are set; and a reached TMP3 flag (HitTMP3), a reached TMP5 flag (HitTMP5), and a time flag are cleared. TMP5 represents a first predefined low set point.

At block 520, cooling system 120 enters normal cooling mode 210 with evaporator fan 130 remaining ON and compressor 128 transitioning from OFF to ON. The voltage check at block 514 guards against turning compressor 128ON when voltage levels that are potentially damaging to compressor 128 are being supplied by the power source 122.

Figure 6A:
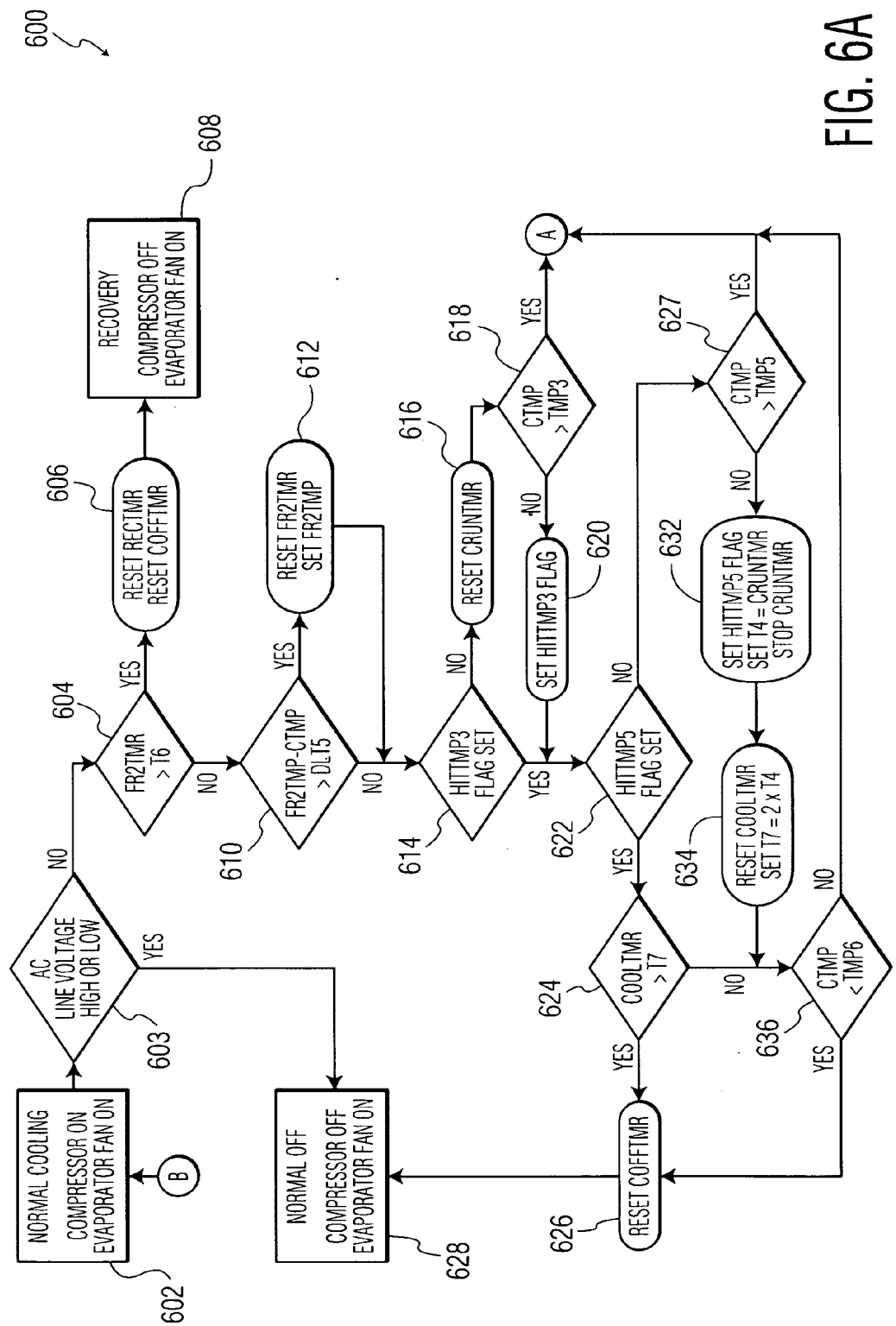
FIG. 6A is a flow chart of exemplary steps for monitoring and controlling the cooling system in a normal cooling mode in accordance with an exemplary embodiment of the present invention.
Figure 6B:
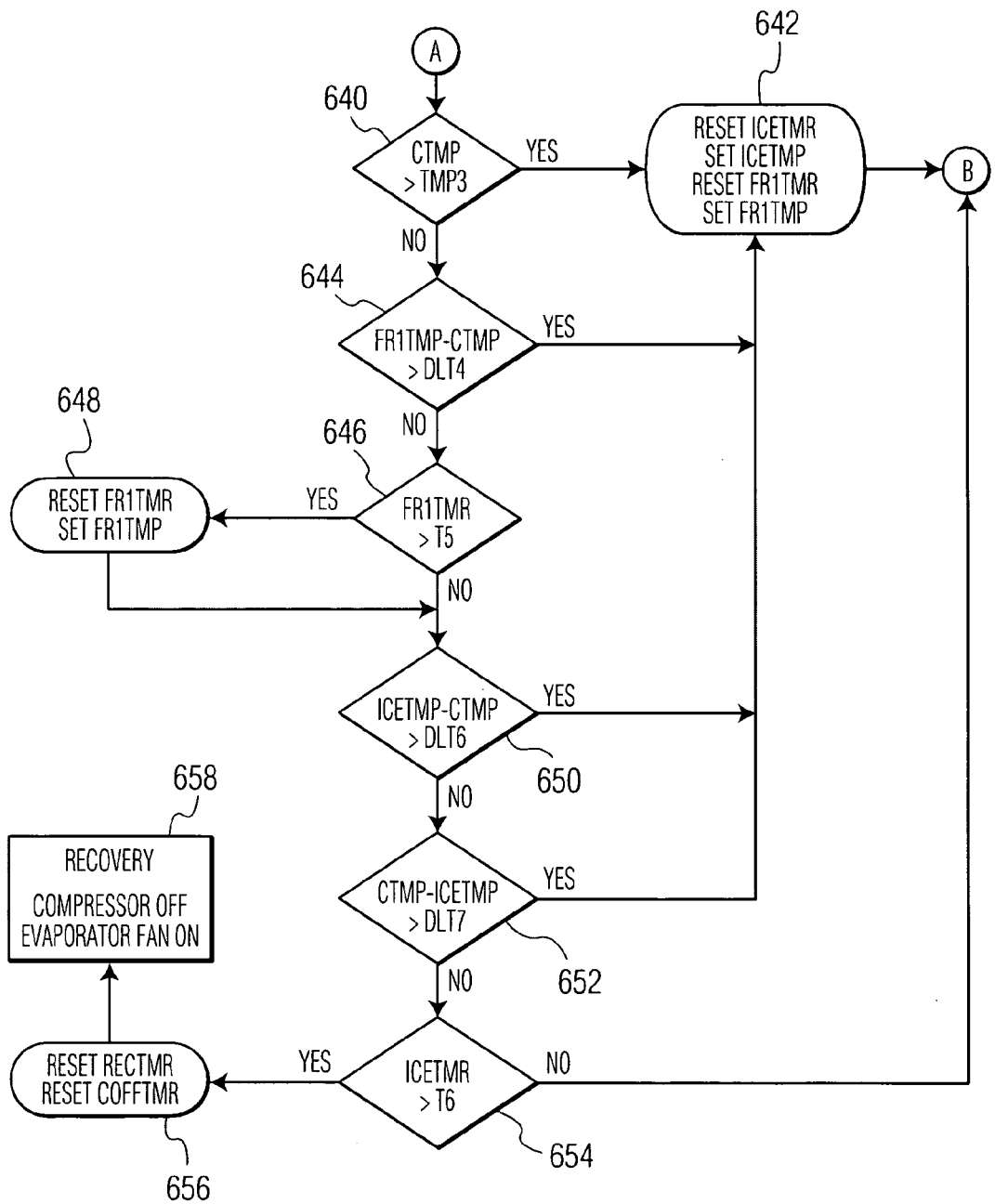
FIG. 6B is a continuation of the flow chart of FIG. 6A.

FIGS. 6A and 6B depict a flow chart 600 of exemplary steps for normal cooling mode 210 (FIG. 2). At block 602, normal cooling mode 210 is entered. In an exemplary embodiment, normal cooling mode 210 is entered from normal off mode 208. In normal cooling mode 210, compressor 128 is ON and evaporator fan 130 is OFF.

At block 603, a decision is made regarding power source 122. If the power source 122 has a voltage level that is too low or too high, which may damage cooling system 120, processing proceeds at block 628 with the cooling system 120 entering normal off mode 208. Otherwise, processing proceeds at block 604.

At block 604, a decision is made regarding FR2TMR. If FR2TMR is greater than a maximum predefined time since FR2TMR was last reset (T6), processing proceeds at block 606 with a recovery timer (RECTMR) and COFFTMR being reset. Recovery mode 212 is then entered at block 608 with compressor 128 transitioning from ON to OFF and evaporator fan 130 remaining ON. Otherwise, processing proceeds at block 610.

At block 610, a decision is made regarding FR1TMP and CTMP. If FR2TMP minus CTMP is greater than a predefined minimum temperature change to reset FR1TMR (DLT5), processing proceeds at block 612 with FR2TMR being reset and FR2TMP being set. Otherwise, processing proceeds at block 614.

At block 614, a decision is made regarding HitTMP3. If HitTMP3 is not set, processing proceeds at block 616 with the reset of a run timer for compressor 128 (CRUNTMR). Otherwise, processing proceeds at block 622.

At block 618, a decision is made regarding CTMP. If CTMP is not greater than TMP3, processing proceeds at block 620 with HitTMP3 flag being set. Otherwise, processing proceeds at block 640 (see FIG. 6B).

At block 622, a decision is made regarding HitTMP5 flag. If HitTMP flag is set, processing proceeds at block 624. Otherwise, processing proceeds at block 627.

At block 624, a decision is made regarding the elapsed running time of compressor 128 since the HitTMP5 flag was set (COOLTMR). If COOLTMR is greater than a maximum time set for COOLTMR (T7), e.g., a predefined maximum or twice the value of CRUNTMR once HitTMP5 flag is set, processing proceeds at block 626 with COFFTMR being reset and cooling system 120 reentering normal off mode 208 at block 628. Otherwise, processing proceeds at block 636. When transitioning from normal cooling mode 210 to normal off mode 208, evaporator fan 130 remains ON and compressor 128 is transitioned from ON to OFF.

At block 627, a decision is made regarding CTMP. If CTMP is greater than TMP5, processing proceeds at block 640 (see FIG. 6B). Otherwise, processing proceeds at block 632 with HitTMP5 being set, T4 being set to CRUNTMR, and CRUNTMR being stopped. At block 634, COOLTMR is reset and T7 is set to twice T4.

At block 636, a decision is made regarding CTMP. If CTMP is less than a second predefined cooling mode low set point (TMP6), processing proceeds at block 626 with COFFTMR being reset and cooling system 120 reentering the normal off mode 208 at block 628. Otherwise, processing proceeds at block 640 (see FIG. 6B).

At block 640 (see FIG. 6B), which is reached if CTMP is greater than TMP3 at block 618 or CTMP is greater than TMP5 at block 627 or CTMP is not less than TMP6 at block 636, a decision is made regarding CTMP. If CTMP is greater than TMP3, ICETMR and FR1TMR are reset, ICETMP and FR1TMP are set at block 642, and cooling system 120 remains in normal cooling mode 210 at block 602. Otherwise, processing proceeds at block 644.

At block 644, a decision is made regarding the temperature when FR1TMR was reset (FR1TMP) and CTMP. If CTMP is less than FR1TMP by at least a predefined minimum drop to reset FR1TMR, processing proceeds at block 642. Otherwise, processing proceeds at block 646.

At block 646, a decision is made regarding FR1TMR. IF FR1TMR is greater than a predefined maximum time since FR1TMR was reset (T5), FR1TMR is reset and FR1TMP is set at block 648. Otherwise, processing proceeds at block 650.

At blocks 650 and 652, decisions are made regarding ICETMP and CTMP. If ICETEMP minus CTMP is greater than a predefined minimum drop in temperature to reset ICETMR (DLT6) or CTMP minus ICETMP is greater than a predefined minimum rise in temperature to reset ICETMR (DLT7), processing proceeds at block 642 (described above) and cooling system 120 remains in normal cooling mode 210 at block 602. Otherwise, processing proceeds at block 654.

At block 654, a decision is made regarding ICETMR. If ICETMR is greater than T6, processing proceeds at block 656 where RECTMR and COFFTMR are reset, and cooling system 120 enters recover mode 212 at block 658. Otherwise, cooling system 120 remains in normal cooling mode 212 at block 602. When transitioning from normal cooling mode 210 to recovery mode 212, the evaporator fan 130 remains ON and compressor 128 is transitioned from ON to OFF.

Figure 7:
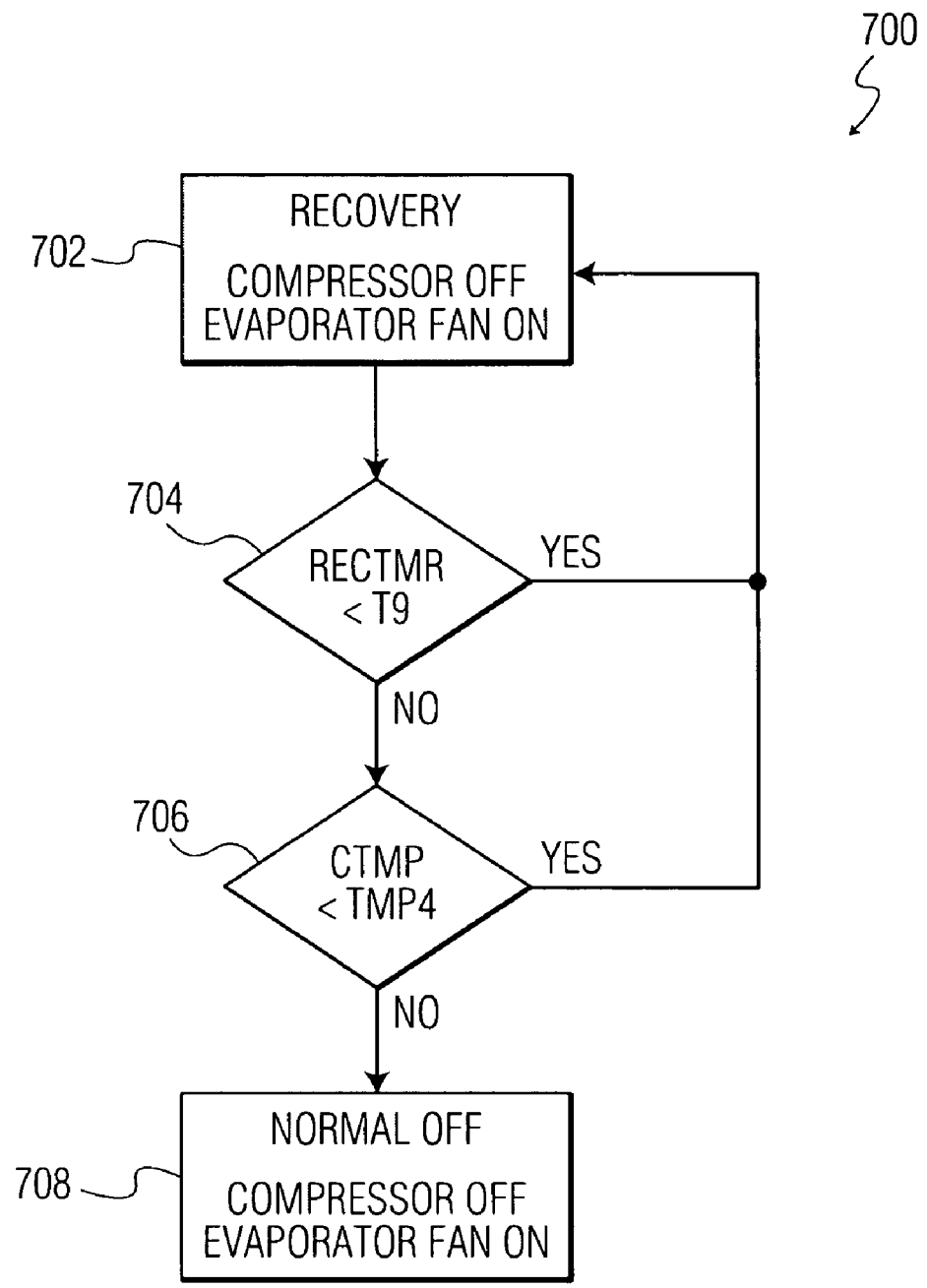
FIG. 7 is a flow chart of exemplary steps for monitoring and controlling the cooling system in a recovery mode in accordance with an exemplary embodiment of the present invention.

FIG. 7 depicts a flow chart 700 of exemplary steps for recovery mode 212 (FIG. 2). At block 702, recovery mode 212 is entered. In an exemplary embodiment, recovery mode 212 is entered when cooling system 120 detects a possible frozen evaporator coil condition (e.g., based on temperature readings and timer values processed in accordance with the steps of flow chart 600). Recovery mode 212 is entered from normal cooling mode 210 and exits to normal off mode 208. In recovery mode 212, compressor 128 is OFF and evaporator fan 130 is ON. When entering recovery mode 212 from normal cooling mode 210, evaporator fan 130 remains ON and compressor 128 is transitioned from ON to OFF. Turning compressor 128 OFF prevents condensation on the evaporator coils (not shown) of cooling system 120 from freezing and leaving evaporator fan 130 ON reduces condensation on the evaporator coils. This prevents the evaporator coils from freezing up, thereby improving the efficiency of cooling system 120.

At block 704, a decision is made regarding RECTMR. If RECTMR is not less than T7, processing proceeds to block 706. Otherwise, processing proceeds at block 702 with cooling system 120 remaining in recovery mode 212. In an exemplary embodiment, T7 is between about 5 and 60 minutes, e.g., 30 minutes.

At block 706, a decision is made regarding CTMP. If CTMP is not less than a predefined recovery high set point (TMP4), processing proceeds at block 708 with cooling system 120 transitioning from recovery mode 212 to normal off mode 208 at block 708. Otherwise, processing proceeds at block 702 with cooling system 120 remaining in recovery mode 212. When transitioning from recovery mode 212 to normal off mode 208, compressor 128 remains OFF and evaporator fan 130 remains ON.

Figure 8:
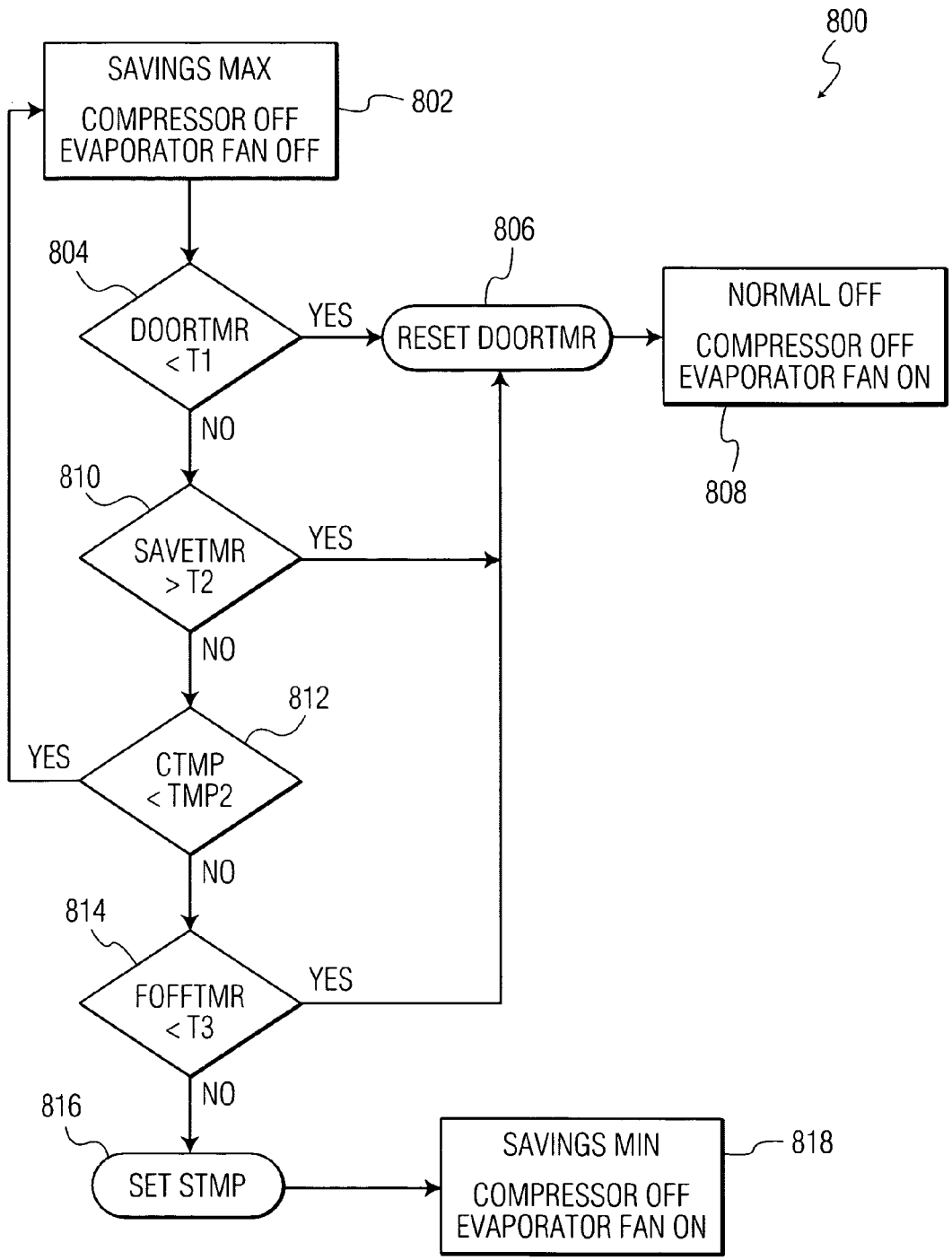
FIG. 8 is a flow chart of exemplary steps for monitoring and controlling the cooling system in a savings maximum mode in accordance with an exemplary embodiment of the present invention.

FIG. 8 depicts a flow chart 800 of exemplary steps for energy savings max mode 214 (FIG. 2). At block 802, energy savings max mode 214 is entered. In an exemplary embodiment, energy savings max mode 214 is entered from normal off mode 208 and exits to either normal off mode 208 or energy savings min mode 216. In energy savings max mode 214, compressor 128 of cooling system 120 is OFF and evaporator fan 130 is OFF.

At block 804, a decision is made regarding DOORTMR. If DOORTMR is less than a predefined minimum time since door 112 was detected open (T1), processing proceeds at block 806 with the reset of DOORTMR and cooling system 120 enters normal off mode 208 at block 808. Otherwise processing proceeds at block 810.

At block 810, a decision is made regarding SAVETMR. If SAVETMR is greater than a predefined maximum time since entering the savings minimum or maximum mode (T2), processing proceeds at block 806 with the reset of DOORTMR and cooling system 120 enters normal off mode 208 at block 808. Otherwise, processing proceeds at block 812. When transitioning from savings max mode 214 to normal off mode 208, compressor 128 remains OFF and evaporator fan 130 is transitioned from OFF to ON.

At block 812, a decision is made regarding CTMP. If CTMP is less than a predefined high set point for energy savings mode 204 (TMP2), cooling system 120 remains in energy savings max mode 214 at block 802. Otherwise, processing proceeds at block 814.

At block 814, a decision is made regarding FOFFTMR. If FOFFTMR is less than a predefined minimum time since evaporator fan 130 was turned OFF (T3), processing proceeds at block 806 with the reset of DOORTMR and cooling system 120 enters normal off mode 208 at block 808. Otherwise, processing proceeds at block 816 where a temperature when savings min mode 216 was entered (STMP) is set and cooling system 120 enters energy savings min mode 216 at block 818. When transitioning from savings max mode 214 to savings min mode 216, compressor 128 remains OFF and evaporator fan 130 is transitioned from OFF to ON.

Figure 9:
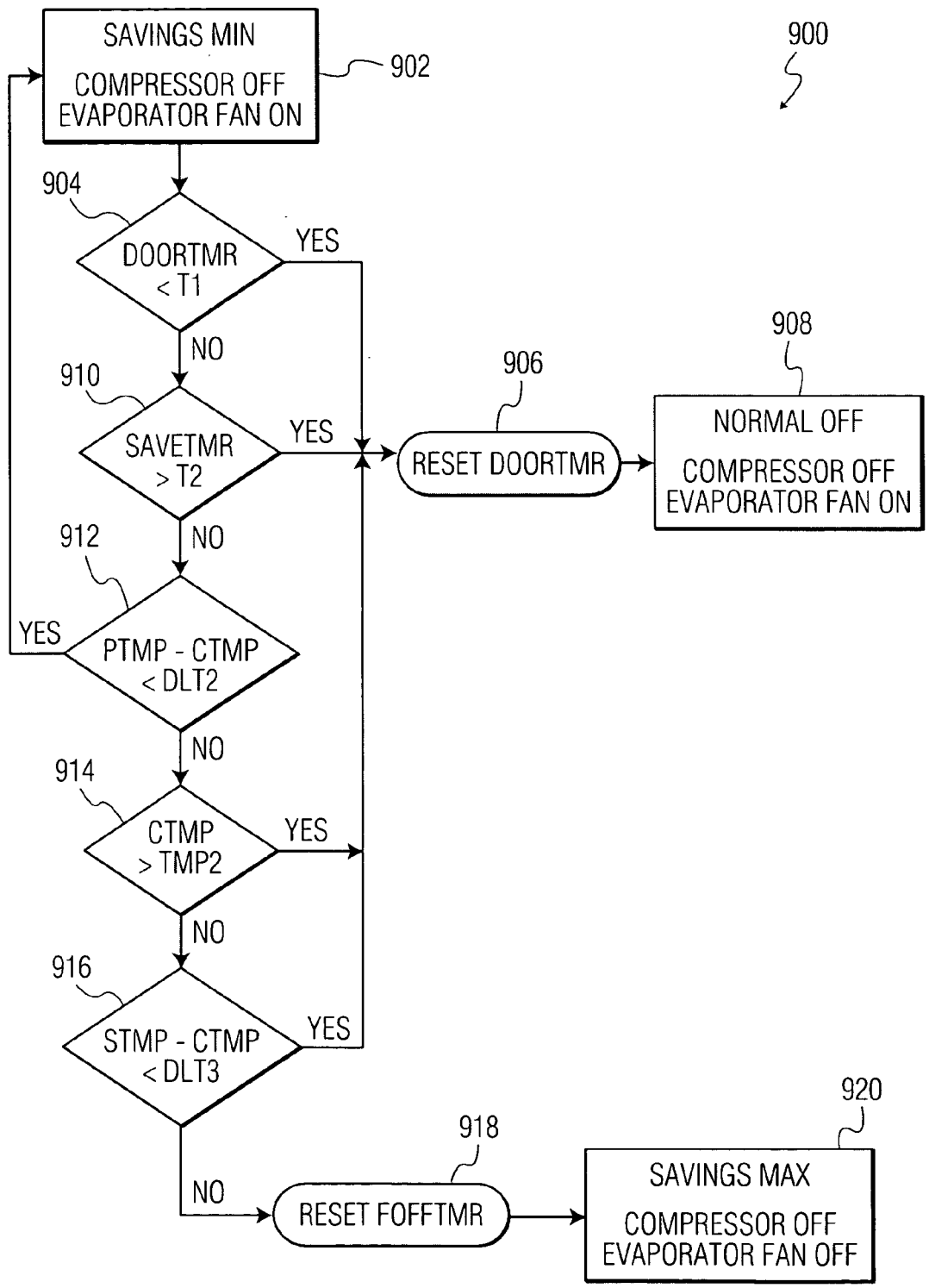
FIG. 9 is a flow chart of exemplary steps for monitoring and controlling the cooling system in a savings minimum mode in accordance with an exemplary embodiment of the present invention.

FIG. 9 depicts a flow chart 900 of exemplary steps for energy savings min mode 216 (FIG. 2). At block 902, energy savings min mode 216 is entered. In an exemplary embodiment, energy savings min mode 216 is entered from energy savings max mode 214 and exits to either normal off mode 208 or energy savings max mode 214. In energy savings min mode 216, compressor 128 of cooling system 120 is OFF and evaporator fan 130 is ON.

At block 904, a decision is made regarding DOORTMR. If DOORTMR is less than T1, processing proceeds at block 906 with the reset of DOORTMR and cooling system 120 entering normal off mode 208 at block 908. Otherwise, processing proceeds at block 910. When transitioning from energy savings min mode 216 to normal off mode 208, compressor 128 remains OFF and evaporator fan 130 remains ON.

At block 910, a decision is made regarding SAVETMR. If SAVETMR is greater than T2, processing proceeds at block 906 with the reset of DOORTMR and cooling system 120 entering normal off mode 208 at block 908. Otherwise, processing proceeds at block 912.

At block 912, a decision is made regarding PTMP and CTMP. If PTMP minus CTMP is not less than a predefined minimum temperature drop per minute to stay in energy savings min mode (DLT2), processing proceeds at block 914. Otherwise, processing proceeds at block 902 with cooling system 120 remaining in energy savings min mode 216.

At block 914, a decision is made regarding CTMP. If CTMP is greater than TMP2, processing proceeds at block 906 with the reset of DOORTMR and cooling system 120 entering normal off mode 208 at block 908. Otherwise, processing proceeds at block 916.

At block 916, a decision is made regarding STMP and CTMP. If STMP minus CTMP is less than a predefined minimum temperature drop since entering energy savings min mode 216 (DLT3), processing proceeds at block 906 with the reset of DOORTMR and cooling system 120 entering normal off mode 208 at block 908. Otherwise, processing proceeds at block 918 with the reset of FOFFTMR and cooling system 120 entering energy savings max mode 214 at block 920. When transitioning from energy savings min mode 216 to energy savings max mode 214, compressor 128 remains OFF and evaporator fan 130 transitions from ON to OFF.

In an exemplary embodiment, processor 136 further controls LED 138. In accordance with this embodiment, processor 136 selectively sets LED 138 in one of a plurality of states corresponding to the current mode of cooling system 120. Exemplary cycle times for all LED states except a door open condition are 1 second, for example. For a door open condition, the LED may have a 50% duty cycle with 0.2 second cycle time for 5 seconds. In initialization mode, LED 138 may flash twice to indicate processor 136 and temperature sensor 140 are operational at power-up. In normal off mode 208, LED 138 may remain ON continuously. In normal cooling mode 210 with a door open detection within a predefined number of minutes, e.g., 15 minutes, LED 138 may have a 90% duty cycle. In normal cooling mode 210 without a door open detection within a predefined number of minutes, e.g., 15 minutes, LED 138 may have a 50% duty cycle. In energy savings modes 214/216, LED 138 may have a 10% duty cycle. In recovery mode 212, LED 138 may be OFF. Thus, LED 138 provides information indicative of the operation of cooling system 120, which may be useful for servicing cooling system 120.

In accordance with aspects of the present invention, one or more energy savings modes are added to the normal modes of operation (e.g., a cooling needed mode and a no cooling needed mode) typically found in conventional cooling systems. In exemplary embodiments, evaporator fan 130 is OFF during at least one energy savings mode (e.g., energy savings max mode 214) while compressor 128 is OFF. By turning evaporator fan 130 OFF, energy required to run evaporator fan 130 is no longer introduced to interior 104 of appliance 130 and, thus, does not need to be removed, e.g., through operation of compressor 128. Thus, energy savings may be realized through the decreased operation of both compressor 128 and evaporator fan 130.

Additionally, exemplary embodiments of the present invention look at the rate of temperature change within interior 104 of appliance 100 to determine if door 112 is open and to identify possible freeze-up conditions of evaporator fan 130 in addition to (or instead of) looking solely at the absolute temperature within the interior 104 of appliance 100 to determine if it is above or below high and low set points as in conventional systems. By looking at the rate of temperature change, cooling system 120 can determine whether compressor 128 is decreasing the temperature and, depending on the times and temperatures involved, cooling system 120 can transition compressor 128 OFF and enter another mode of operation such as recovery mode 212 to clear frozen compressor coils or normal off mode 208.

Cooling system 120 may look at multiple rates of change timers and temperatures, e.g., to determine particular door open events or frozen compressor coils. For example, cooling system 120 may operate normally and yet never reach a low set point due to appliance 100 having very high sales activity and/or being frequently reloaded with product. In this case, a long term rate of change may not be reached, but the short term rates of change may be reached several times (e.g., a long term timer may look for a 6 degree drop in temperature over the course of an hour and a short term timer may look for a 1 degree drop in ten minutes). If door 112 is opened every 5 to 10 minutes, the short term rate of change may be satisfied, but the temperature never drops by more than the couple of degrees needed to satisfy the long term rate of change. This indicates that compressor 120 is cooling interior 104 of appliance 100 and, thus, that the compressor coils are not frozen-up. In another example, cooling system 120 may not satisfy either the short term or the long term rates of change, thereby indicating frozen compressor coils. Accordingly, cooling system 120 may transition to recovery mode 212.

Various aspects of the invention may be implemented in software that configures a computer (not shown) such as a microcontroller. In accordance with this embodiment, one or more of the functions of processor 136 and timer 146 may be implemented in software. Firmware may be employed to monitor inputs (e.g., inputs from temperature sensor 140, occupancy sensor 144, and/or proximity sensor 142). Software may be embodied in a computer readable carrier, for example, a magnetic or optical disk, a memory-card or an audio frequency, radio-frequency, or optical carrier wave.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for managing electric power consumed by an appliance having an interior accessible by consumers through a door having an open state and a closed state, the appliance including a cooling system having at least a first mode of operation and a second mode of operation for cooling the interior of the appliance, the method comprising:
   monitoring the appliance to identify the open state of the door; and
   transitioning the cooling system of the appliance from the first mode of operation to the second mode of operation responsive at least in part to identification of the open state of the door.

2. The method of claim 1, wherein the interior of the appliance accessible by consumers has an internal temperature and wherein the method further comprises:
   monitoring the internal temperature of the interior of the appliance; and
   transitioning the cooling system of the appliance from the second mode of operation to the first mode of operation responsive at least in part to the monitored internal temperature being below a predefined temperature and the door open state not being identified for a predefined period of time.

3. The method of claim 1, wherein the first mode of operation is an energy savings mode of operation and the second mode of operation is a normal mode of operation.

4. The method of claim 3, wherein the cooling system includes an evaporator fan and a compressor and wherein the energy savings mode of operation includes an energy savings minimum mode in which the evaporator fan is on and the compressor is off and an energy savings maximum mode in which the evaporator fan is off and the compressor is off.

5. The method of claim 4, wherein the normal mode of operation includes an initialization mode in which the evaporator fan is off and the compressor is off, a recovery mode in which the evaporator fan is on and the compressor is off, a normal off mode in which the evaporator fan is on and the compressor is off, and a normal cooling mode in which the evaporator fan is on and the compressor is on.

6. The method of claim 5, wherein the cooling system further comprises an evaporator coil and wherein the method further comprises:
   transitioning the cooling system from the normal cooling mode to the recovery mode prior to transitioning to the normal off cooling mode if the compressor has been on longer than a predetermined period of time, whereby the evaporator coil is prevented from freezing up.

7. The method of claim 5, further comprising the step of:
   providing a visual indication of a current mode of the cooling system with a visual indicator.

8. The method of claim 1, wherein the monitoring includes:
   obtaining and storing a prior temperature within the interior of the appliance;
   obtaining a current temperature within the interior of the appliance;
   comparing the current temperature to the prior temperature to develop a rate of temperature change; and identifying the door open state if the rate of temperature change is greater than a predefined rate of change.

9. The method of claim 1, wherein the monitoring includes:
monitoring a proximity switch that is actuated when the door of the appliance is open; and
identifying the door open state when the proximity switch is actuated.

10. The method of claim 1, wherein the monitoring includes:
monitoring an occupancy sensor positioned within the interior of the appliance; and
identifying the door open state when the occupancy sensor senses movement.

11. A method for managing electric power consumed by an appliance having an interior accessible by consumers through a door having an open state and a closed state, the appliance including a cooling system having at least an energy savings mode of operation and a normal mode of operation for cooling the interior of the appliance, the interior of the appliance having an internal temperature, the method comprising:
monitoring the door to identify the open state of the door;
monitoring the internal temperature of the interior of the appliance;
transitioning the cooling system of the appliance from the energy savings mode of operation to the normal mode of operation responsive at least in part to identification of the open state of the door; and
transitioning the cooling system of the appliance from the normal mode of operation to the energy savings mode of operation responsive at least in part to the monitored internal temperature being below a predefined temperature and the door open state not being identified for a predefined period of time.

12. The method of claim 11, wherein the monitoring of the door includes:
obtaining a current temperature within the interior of the appliance;
obtaining a prior temperature within the interior of the appliance;
comparing the current temperature to the prior temperature to develop a rate of temperature change; and
identifying the door open state if the rate of temperature change is greater than a predefined rate of change.

13. The method of claim 11, wherein the cooling system includes an evaporator fan and a compressor, wherein the energy savings mode of operation includes (i) an energy savings minimum mode in which the evaporator fan is on and the compressor is off and (ii) an energy savings maximum mode in which the evaporator fan is off and the compressor is off, and wherein the normal mode of operation includes (iii) an initialization mode in which the evaporator fan is off and the compressor is off, (iv) a recovery mode in which the evaporator fan is on and the compressor is off, (v) a normal off mode in which the evaporator fan is on and the compressor is off, and (vi) a normal cooling mode in which the evaporator fan is on and the compressor is on.

14. The method of claim 13, wherein the cooling system further comprises an evaporator coil and wherein the method further comprises:
transitioning the cooling system from the normal cooling mode to the recovery mode prior to transitioning to the normal off cooling mode if the compressor has been on longer than a predetermined period of time, whereby the evaporator coil is prevented from freezing up.

15. An appliance that manages electric power consumption, the appliance comprising:
a housing including a product display area having an interior, the interior having a temperature;
a door coupled to the housing through which consumers access the product display area, the door having an open state and a closed state; and
a cooling system having at least an energy savings mode of operation and a normal mode of operation coupled to the interior of the product display area, the cooling system;
monitoring the appliance to identify the door open state;
controlling the temperature within the interior of the product display area, and
transitioning between the energy savings mode of operation and the normal mode of operation responsive at least in part to identification of the door open state.

16. The appliance of claim 15, further comprising:
a temperature sensor coupled to the cooling system, the temperature sensor positioned within the interior of the product display area and generating a temperature signal representing the temperature within the interior of the product display area,
wherein the cooling system monitors the appliance to identify the door open state by monitoring a rate of change of the temperature signal.

17. The appliance of claim 15, further comprising:
an occupancy sensor positioned within the interior of the product display area, the occupancy sensor generating an occupancy signal responsive to movement of the door,
wherein the cooling system identifies the door open state responsive to the occupancy signal.

18. The appliance of claim 15, further comprising:
a proximity switch coupled to the housing, the proximity switch generating an actuated signal responsive to movement of the door,
wherein the cooling system identifies the door open state responsive to the actuated signal.

19. The appliance of claim 15, wherein the appliance receives power from a power source and wherein the cooling system includes:
a compressor;
an evaporator fan;
a first switch coupled to the compressor that couples the compressor to the power source responsive to a first control signal;
a second switch coupled to the evaporator fan that couples the evaporator fan to the power source responsive to a second control signal; and
a processor coupled to the first and second switch, the processor generating the first and second control signals responsive to the door open state and the temperature within the interior of the product display area.

20. The appliance of claim 15, further comprising:
a visual indicator coupled to the cooling system, the visual indicator indicating a current one of the modes of operation of the cooling system.

* * * * *